United States Patent
Peyerl et al.

(10) Patent No.: US 11,764,587 B2
(45) Date of Patent: Sep. 19, 2023

(54) METHOD, ENERGY UNIT, HOUSING, AND DEVICE FOR DELIVERING INFORMATION CONTENT TO MOBILE UNITS

(71) Applicant: Alpine Media Technology LLC, Centennial, CO (US)

(72) Inventors: Frederich Peyerl, Centennial, CO (US); Gerrit VandeKemp, Centennial, CO (US); Jeffrey Connors, Centennial, CO (US)

(73) Assignee: Alpine Media Technology, Centennial, CO (US)

( * ) Notice: Subject to any disclaimer, the term of this patent is extended or adjusted under 35 U.S.C. 154(b) by 174 days.

(21) Appl. No.: 16/853,662

(22) Filed: Apr. 20, 2020

(65) Prior Publication Data

US 2020/0250703 A1 Aug. 6, 2020

Related U.S. Application Data

(63) Continuation of application No. PCT/US2018/056688, filed on Oct. 19, 2018.
(Continued)

(51) Int. Cl.
*H02J 7/00* (2006.01)
*B61B 12/00* (2006.01)
(Continued)

(52) U.S. Cl.
CPC .......... *H02J 7/0013* (2013.01); *B61B 12/002* (2013.01); *G06Q 30/0255* (2013.01);
(Continued)

(58) Field of Classification Search
CPC .......... H04N 21/414; H04N 21/41422; G06Q 30/0255; G06Q 30/0267; B61B 12/002; G09F 23/02; G09F 2023/005
See application file for complete search history.

(56) References Cited

U.S. PATENT DOCUMENTS 6,072,274 A * 6/2000 Jondrow ........... G02F 1/133305
313/308
7,500,678 B1 3/2009 Whiting
(Continued)

FOREIGN PATENT DOCUMENTS

CA 2962600 A1 3/2016
KR 20080026394 A * 9/2006
(Continued)

OTHER PUBLICATIONS

International Search Report, PCT/US2018/05668, dated Aug. 2, 2019.

*Primary Examiner* — Yassin Alata

(57) ABSTRACT

Disclosed herein are devices and methods providing directed media content to an individual on a mobile unit, as well as devices and methods for the rapid storage of power on mobile units to power the devices providing media content to an individual user. The disclosed devices and methods allow for such mobile units to power electronic components located on the mobile units. Furthermore, the disclosed devices and methods allow for securing a media-delivery device to a safety bar or other portion of a mobile unit without comprising the safety or integrity of the mobile unit.

17 Claims, 13 Drawing Sheets

Related U.S. Application Data

(60) Provisional application No. 62/574,511, filed on Oct. 19, 2017.

(51) Int. Cl.
    *G06Q 30/0251*     (2023.01)
    *G09F 23/02*     (2006.01)
    *H04N 21/414*     (2011.01)
    *H02J 50/40*     (2016.01)
    *H02J 50/10*     (2016.01)
    *G09F 23/00*     (2006.01)

(52) U.S. Cl.
    CPC ......... *G06Q 30/0267* (2013.01); *G09F 23/02* (2013.01); *H02J 50/10* (2016.02); *H02J 50/40* (2016.02); *H04N 21/414* (2013.01); *H04N 21/41422* (2013.01); *G09F 2023/005* (2013.01)

(56) References Cited

U.S. PATENT DOCUMENTS

| | | | |
|---|---|---|---|
| 7,810,434 B2 | 10/2010 | Flom | |
| 8,782,933 B2 | 7/2014 | Jay | |
| 2004/0248619 A1* | 12/2004 | Graiger | ............... G05B 19/409 <br> 455/566 |
| 2007/0279930 A1* | 12/2007 | Aoki | ................. H05K 7/20972 <br> 362/561 |

FOREIGN PATENT DOCUMENTS

| | | | | |
|---|---|---|---|---|
| KR | 20080026394 A | | 3/2008 | |
| WO | WO-2016049550 A1 | * | 3/2016 | ............... B60L 1/02 |

\* cited by examiner

METHOD, ENERGY UNIT, HOUSING, AND DEVICE FOR DELIVERING INFORMATION CONTENT TO MOBILE UNITS

PRIORITY

This application claims the benefit of priority of U.S. Provisional Application Ser. No. 62/574,511, filed on Oct. 19, 2017, the entirety of which is incorporated herein by reference.

FIELD OF THE INVENTION

The methods and systems disclosed herein relate to providing information content to one or more individuals on mobile units.

BACKGROUND

In certain industries, unpowered vehicles such as chairlifts and certain amusement park rides transport individuals from one place to another place. Such vehicles are typically attached to a system that moves the vehicles from place to place, while the vehicles themselves are merely shells to provide space to carry the individuals. In some instances, the vehicles carry radios or other low energy systems that can be powered by batteries that are charged over a long period of time prior to use. In these industries, the vehicles are in constant motion and cannot be taken out of service to recharge batteries during periods when they are in use— periods that can last for up to 10 hours or longer.

Nevertheless, there are many applications in which present batteries are insufficient. For instance, media systems comprising LCD screens require a tremendous amount of power. In addition, systems that stream media require energy sources with high energy storage capacity. Such systems require a device that can deliver the energy necessary to run these devices. However the device would also need to be charged rapidly in an environment where long periods for recharging are not available, such as in the case of a chairlift or an amusement park ride.

Furthermore, delivering targeted advertising content to individuals on such mobile units would allow for increased revenue for the ride owners. Such targeted delivery however is difficult considering that the individuals on the rides are not known when they enter the rides. Unless the individuals entering the ride are exactly positioned, the delivery of content will fail to be targeted. In addition, inclusion of devices that can deliver such content can destabilize an entertainment ride and render it unsafe under certain conditions.

Therefore, there remains a need for a system that can charge rapidly and for such devices to deliver targeted content to individuals on mobile unites such as chairlifts and amusement park rides. In addition, there remains a need for a system that can be safely placed onto mobile rides such as chairlifts.

SUMMARY

Disclosed herein are media-delivery devices that provide targeted content to particular users of the mobile units. The disclosed media-delivery devices and methods allow for a user of a mobile unit to access a display and to access information on that display. The information that can be accessed on the display includes media content, map information, advertising content, music content, and other media content (e.g., audio, video, and pictorial). The disclosed media-delivery devices are connected to powering devices capable of rapid charging so that the mobile unit can be charged while in use and there is no requirement to take the mobile unit out of service. The disclosed powering devices further have the capacity to power the media-delivery devices with very high energy demands—a feature that has not been available before this disclosure.

Aspects of the disclosed media-delivery devices further have a housing design that decreases issues relating to sail area and weight. Embodiments of the disclosed housing design decreases the total surface area added to a bar and increases the sturdiness of the panel design by adding interior fins for additional support. The disclosed housing design minimizes weight and thickness, while maintaining strength of the device.

Aspects disclosed herein also include a media-delivery identification system comprising a media-delivery device having a display, a processor, and a computer-readable memory, the processor being connected to the computer-readable memory, the media-delivery device being operably linked to one or more power units comprising a charging couple and at least one energy storage unit, the media-delivery device further comprising an individual identification unit, the individual identification unit being configured to obtain information from a tag having information relating to a user of the media-delivery device.

In certain embodiments, the system further comprises one or more servers connected to the media-delivery device. In other embodiments, the individual identification unit comprises an antenna to receive information from the tag. In some embodiments, the individual identification unit comprises an antenna to send information to the tag and to receive information from the tag. In yet other embodiments, the individual identification unit comprises circuitry to send or to receive information over one or more radio frequencies.

In particular embodiments, the media-delivery device identification system comprises instructions stored in the computer-readable memory. In certain embodiments, the processor accesses the instructions stored in the computer-readable memory to: i) request information from the one or more servers relating to the identity of the user and ii) request information from the one or more servers relating to the preferences of the user. In further embodiments, the processor accesses the instructions stored in the computer-readable to: iii) receive information from the one or more servers relating to the identity and preferences of the user and iv) provide content based on the user preferences. In yet further embodiments, the processor accesses the instructions stored in the computer-readable memory to: i) provide content from the one or more servers to the user based on an input of the user and ii) request content from the one or more servers based on an identity of the user as determined by the information obtained from the tag and information stored in the one or more servers relating to preferences of the user.

In more particular embodiments, the display is a touchscreen. In still more embodiments, the processor accesses the instructions stored in the computer-readable medium to: i) deliver content to the user and ii) alter content stored in the one or more servers based on an input from the user. In other embodiments, the media-delivery system comprises a network connection. In yet more embodiments, the network connection is a WiFi network or a cellular network.

In certain embodiments, the one or more servers are selected from the group consisting of advertising content servers, display OTA refresh servers, and AMT content servers. In particular embodiments, the one or more servers are business-specific content servers located at the site of the business. In more particular embodiments, the media-delivery system comprises a housing that holds the processor, computer-readable memory, individual identification unit, and display.

In some embodiments, the housing comprises a flat portion connected to a bulbous portion. In further embodiments, the bulbous portion contains the processor, computer-readable memory, and a circuitry. In more particular embodiments, the flat portion comprises the display.

In certain embodiments, the housing comprises two pieces of molded material. In other embodiments, the housing further comprises fins located within housing. In some embodiments, the housing comprises clamps to be attached to a safety bar of a mobile unit. In other embodiments, the media-delivery identification system comprises an electronic multimedia component. In yet other embodiments, the electronic multimedia component comprises one or more ports. In more embodiments, the mobile unit is a chairlift. In still other embodiments, the computer-readable memory is configured to store information selected from the group consisting of streaming data, email data, text data, video data, messaging data, and audio data. In yet other embodiments, the processor accesses instructions stored in the computer-readable memory to: i) stream video data to the display.

In additional embodiments, the housing further comprises a surface configured to allow attachment of a printed media. In more additional embodiments, the display is located within the surface configured to allow attachment of the printed media. In yet more additional embodiments, the housing further comprises attachments for a cover configured to protect the surface and the display. In even more additional embodiments, the fins provide support for the housing.

In certain embodiments, the charging couple comprises a first charging coil. In particular embodiments, the charging couple comprises an operable linkage. In more particular embodiments, the operable linkage connects the charging couple to an energy storage unit. In even more particular embodiments, the energy storage unit is at least one capacitor.

In some embodiments, the energy storage unit is attached to a mobile unit. In other embodiments, the charging couple comprises a second charging coil. In certain embodiments, the first charging coil is operably linked to the energy storage unit.

Aspects disclosed herein include a method of delivering media to a user. The method comprises providing a media-delivery device comprising a display, a processor, a computer-readable memory, and an individual identification unit, the processor being connected to computer-readable memory and providing at least one power unit comprising a charging couple and at least one energy storage unit, the at least one power unit being operably linked to the media-delivery device. In certain embodiments, the method comprises obtaining information relating to the user from the individual identification unit and the processor accessing first instructions from the computer-readable memory in response to the information from the individual identification unit. In further embodiments, the method comprises the processor accessing second instructions from the computer-readable memory relating to providing media content to the user, the processor accessing third instructions to obtain information relating to the user from one or more servers, and the processor accessing fourth instructions to provide media content to the display.

In particular embodiments, the method further comprises the processor executing instructions to communicate with one or more servers connected to the media-delivery device.

In other embodiments, the individual identification unit comprises an antenna to receive information from the tag. In some embodiments, the individual identification unit comprises an antenna to send information to the tag and to receive information from the tag. In yet other embodiments, the individual identification unit comprises circuitry to send or to receive information over one or more radio frequencies.

In particular embodiments, the media-delivery device identification system comprises instructions stored in the computer-readable memory. In certain embodiments, the processor accesses the instructions stored in the computer-readable memory to: i) request information from the one or more servers relating to the identity of the user and ii) request information from the one or more servers relating to the preferences of the user. In further embodiments, the processor accesses the instructions stored in the computer-readable to: iii) receive information from the one or more servers relating to the identity and preferences of the user and iv) provide content based on the user preferences. In yet further embodiments, the processor accesses the instructions stored in the computer-readable memory to: i) provide content from the one or more servers to the user based on an input of the user and ii) request content from the one or more servers based on an identity of the user as determined by the information obtained from the tag and information stored in the one or more servers relating to preferences of the user.

In more particular embodiments, the display is a touchscreen. In still more embodiments, the processor accesses the instructions stored in the computer-readable medium to: i) deliver content to the user and ii) alter content stored in the one or more servers based on an input from the user. In other embodiments, the media-delivery system comprises a network connection. In yet more embodiments, the network connection is a WiFi network or a cellular network.

In certain embodiments, the one or more servers are selected from the group consisting of advertising content servers, display OTA refresh servers, and AMT content servers. In particular embodiments, the one or more servers are business-specific content servers located at the site of the business. In more particular embodiments, the media-delivery system comprises a housing that holds the processor, computer-readable memory, individual identification unit, and display.

In some embodiments, the housing comprises a flat portion connected to a bulbous portion. In further embodiments, the bulbous portion contains the processor, computer-readable memory, and a circuitry. In more particular embodiments, the flat portion comprises the display.

In certain embodiments, the housing comprises two pieces of molded material. In other embodiments, the housing further comprises fins located within housing. In some embodiments, the housing comprises clamps to be attached to a safety bar of a mobile unit. In other embodiments, the media-delivery identification system comprises an electronic multimedia component. In yet other embodiments, the electronic multimedia component comprises one or more ports. In more embodiments, the mobile unit is a chairlift. In still other embodiments, the computer-readable memory is configured to store information selected from the group consisting of streaming data, email data, text data, video data, messaging data, and audio data. In yet other embodiments, the processor accesses instructions stored in the computer-readable memory to: i) stream video data to the display.

In additional embodiments, the housing further comprises a surface configured to allow attachment of a printed media. In more additional embodiments, the display is located within the surface configured to allow attachment of the printed media. In yet more additional embodiments, the housing further comprises attachments for a cover configured to protect the surface and the display. In even more additional embodiments, the fins provide support for the housing.

In certain embodiments, the charging couple comprises a first charging coil. In particular embodiments, the charging couple comprises an operable linkage. In more particular embodiments, the operable linkage connects the charging couple to an energy storage unit. In even more particular embodiments, the energy storage unit is at least one capacitor.

In some embodiments, the energy storage unit is attached to a mobile unit. In other embodiments, the charging couple comprises a second charging coil. In certain embodiments, the first charging coil is operably linked to the energy storage unit.

Additional aspects disclosed herein include a method of media-content delivery wherein the method comprises providing a user with the media-content delivery system, the media-content delivery system being operably linked to an energy storage unit comprising one or more capacitors, the energy storage unit further comprising a charging couple. The method further includes the processor executing instructions in response to a input by the user to obtain information from one or more servers operably linked to the media-content delivery system over a wireless connection. In some embodiments, the processor executing instructions to receive media content from the one or more servers over the wireless connection. In other embodiments, the processor executing instructions to provide the media content to the display, wherein the media content is displayed in a predetermined format relating to the type of media content responsive to the input by the user. The methods of many embodiments include the media-delivery system comprising a housing having a bulbous portion and a thin portion, as well as fins within the bulbous and thin portions such that the fins are configured to reinforce the housing integrity.

BRIEF DESCRIPTION OF THE FIGURES

The foregoing and other objects of the disclosed processes and systems, the various features thereof, may be more fully understood from the following description, when read together with the accompanying drawings in which.

DETAILED DESCRIPTION

Figure 1A:
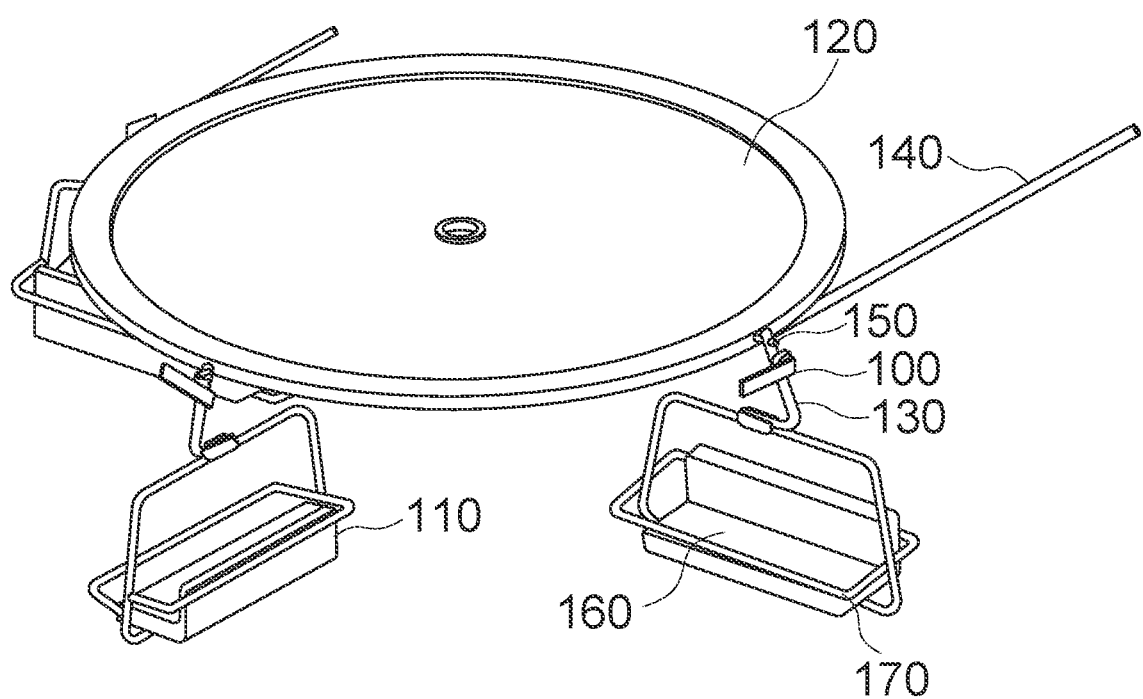
FIG. 1A is a schematic representation of an embodiment of an illustrative device attached to a chairlift.

The patent and scientific literature referred to herein establishes knowledge that is available to those of skill in the art. The issued U.S. patents, allowed applications, published foreign applications, and references, which are cited herein are hereby incorporated by reference to the same extent as if each was specifically and individually indicated to be incorporated by reference.

1. Media-Delivery Devices and Systems

The disclosed media-delivery devices comprise, in some aspects, a processor operably connected to one or more computer-readable media (e.g., RAM) having instructions stored thereon. In some embodiments, the media-delivery device comprises a wireless connection to one or more remote servers having media content stored on the servers. The media-delivery devices further comprise an Individual Identification Unit (hereinafter, "IIU") that has the ability to read information from a tag. In particular embodiments, the tag comprises a circuit that stores and processes information to modulate a radio frequency signal, a collection portion that allow the tag to collect DC power from the IIU, and an antenna to receive and transmit a signal. In some embodiments, the IIU is a RFID. In other embodiments, the IIU is a scanner that scans a bar code or other code. In certain embodiments, the code can be located on an electronic device such as a phone or tablet. In some embodiments, the RFID is passive and receives information from the tag. In other embodiments, the RFID is active, while the tag is passive. In still other embodiments, both the RFID and tag are active. Aspects of the disclosed devices also include IIU that are barcode readers.

Aspects of the present media-delivery devices include instructions in the computer-readable media relating to accessing information stored in one or more remote servers. The method of accomplishing this task includes: the processor accessing instructions upon receipt of information from the IIU. Information can be pertinent information relating to an individual positioned on a mobile device. For instance, the information can relate to the individual's room number at a hotel, the purchases of the individual, the individual's movie or television preferences, the individual's search history on the internet, the individual's preferences on surveys, or other information provided for the individual whose tag is identified by the IIU.

Once the processor accesses the information related to the particular individual user in proximity to the media-delivery device, it requests from the one or more servers pertinent content to be provided to the media-delivery device for storage on the media-delivery device. The processor can execute instructions to provide the media content to a display (e.g., LCD, LED, LCD-LED) automatically upon receipt of the content. Alternatively, the processor can execute instructions to deliver a request to a screen inquiring whether the individual desires to view media content. In some embodiments, the display is a touchscreen display that allows the individual user to modulate the functionality of the device. For instance, the individual user can request information relating to movies available in her hotel room if she is on vacation by pressing the touchscreen on "MOVIES." The processor then executes instructions to deliver this content to the individual user so she may plan her viewing later in her room. In addition, the individual user could request—if staying at a hotel—services by touching a "SERVICES" button on the screen. The processor would execute instructions to deliver the order via the wireless connection to the remote servers that would provide the request to the proper staff.

Figure 6:
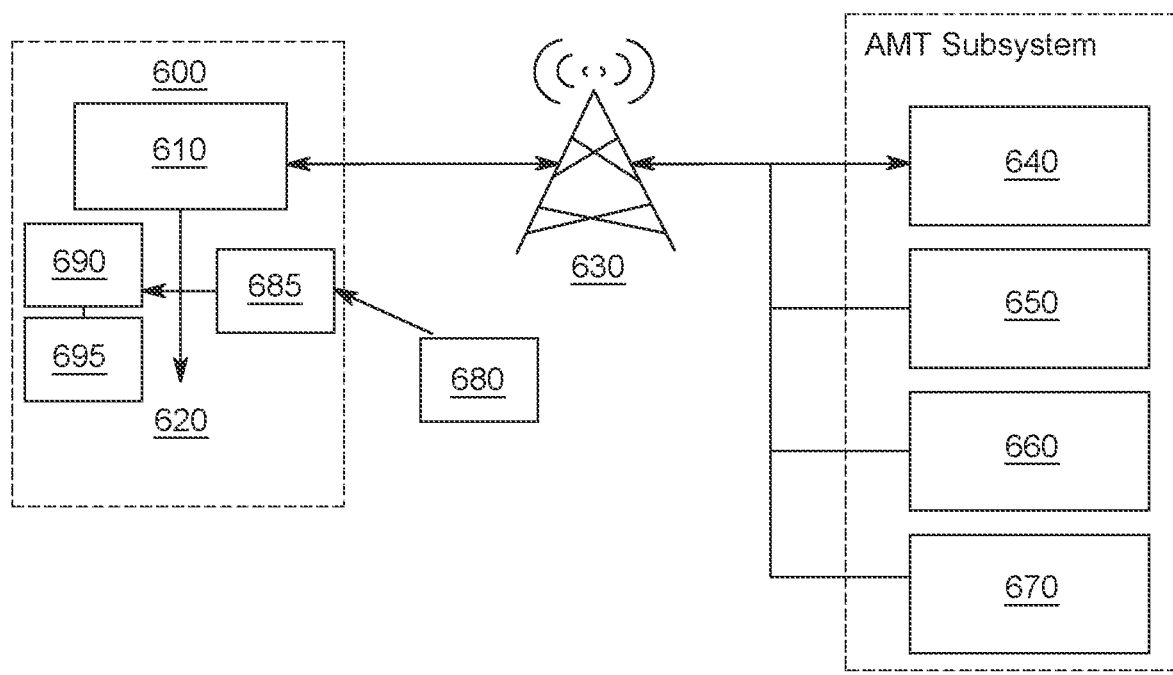
FIG. 6 shows a media-delivery device connected to one or more servers in an exemplary embodiment.

Aspects of the media-delivery devices are included in a broader media-delivery system, shown in FIG. 6. FIG. 6 shows the media-delivery device 600 (also called a Ski Lift Subsystem) having a wireless connection 610 and display 620. The wireless connection in FIG. 6 is over a cellular network. However, any wireless connection is acceptable and functions in the disclosed systems. The wireless connection 610 allows for communication with a network through a network connection 630. Examples of network connections include cellular networks, wireless networks, radio networks, WAN, and LAN.

The media-delivery device 600 connects to a resort content server 640 in the embodiments of FIG. 6. The resort content server (located at AMT Subsystem) 640 contains resort-specific content such as resort services, resort information, and resort activities. The media-delivery device can also be connected to advertising content servers 650, display OTA refresh servers 660, and AMT content servers 670. It should be noted that the one or more servers can be altered depending on the desired content or the architecture that would fit the requirements of the particular operators. For instance, there can be servers that include content relating to an amusement park or that provide necessary information to individual users such as emergency alerts.

In certain embodiments, the system of FIG. 6 operates according to the following exemplary process. A user is provided a tag 680. The tag 680 is read by IIU 685. In this embodiment, the IIU 685 is an RFID. The tag 680 contains information that allows the processor 690 to access information stored in computer-readable memory 695 or one or more servers 640. Information can include the name, address, sex, preferences, recent internet activities, and other information relating to the user. Once the information is accessed by the processor 690, the processor 690 is prepared to respond to instructions depending on the actions taken by the user or other instructions stored in the computer-readable memory 695.

In one embodiment, the display 620 is a touchscreen device. The user is prompted to "Start" the display 620. The processor 690 executes instructions to activate the display 620 to offer one or more options to the user. For instance, the display 620 provides the user with the options of streaming live television, accessing resort-specific activities, playing music, receiving news, texting a contact, and viewing/sending email. In this embodiment, the user touches the virtual button for viewing/sending email. The processor 690 communicates with servers 640 to access information relating to the user and the user's email. The servers 640 provide the information and the processor 690 executes instructions to display the content on the display 620.

In other embodiments, the processor 690 executes instructions to activate the display 620 if no input is received from the user. This can be a default setting where the processor 690 executes instructions to provide advertising media to the display 620. In some embodiments, the processor 690 executes instructions to provide advertising content to the display 620 prior at pre-determined times, such as when the user first operates the system or prior to the user receiving content that the user requested. In particular embodiments, the processor 690 executes instructions to target advertising to the user based on user preferences stored in the servers 640.

2. Media-Delivery Device Housing

Figure 7A:
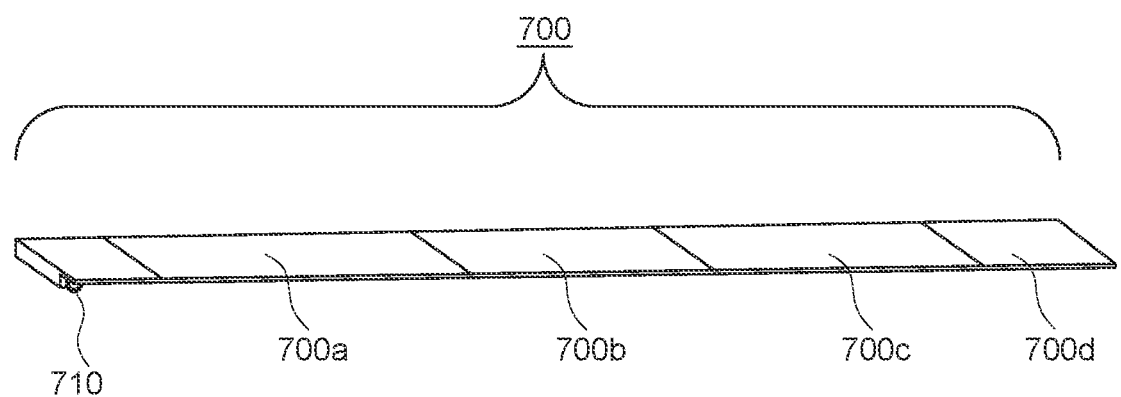
FIG. 7A shows a top view of the media-delivery device housing.

Further aspects of the media-delivery system includes a design for the media-delivery device housing that reduces the sail area of the media delivery system. One embodiment of this design is shown in FIGS. 7A-7D. FIG. 7A shows the panel 700 design of the housing in a top view. In this embodiment, four display panels 700a-d are provided. As such, a plurality of displays can be placed on the media-delivery housing. The media-delivery device can contain from 1 to a plurality of panels (e.g., 10 or more panels). The media-delivery device housing can be designed to have a low profile and to fit in close proximity to the safety or comfort bar. As shown in FIG. 7A, the clamp 710 disposed on the underside of the device 700 will position the safety bar in the thin portion of the media-delivery device. The "b" shape of this embodiment allows for the electrical components, such as the processor, WiFi connectivity, IIU, and circuitry to be contained in the design while reducing the overall area that the device adds to the bar to which it is secured.

Figure 7B:
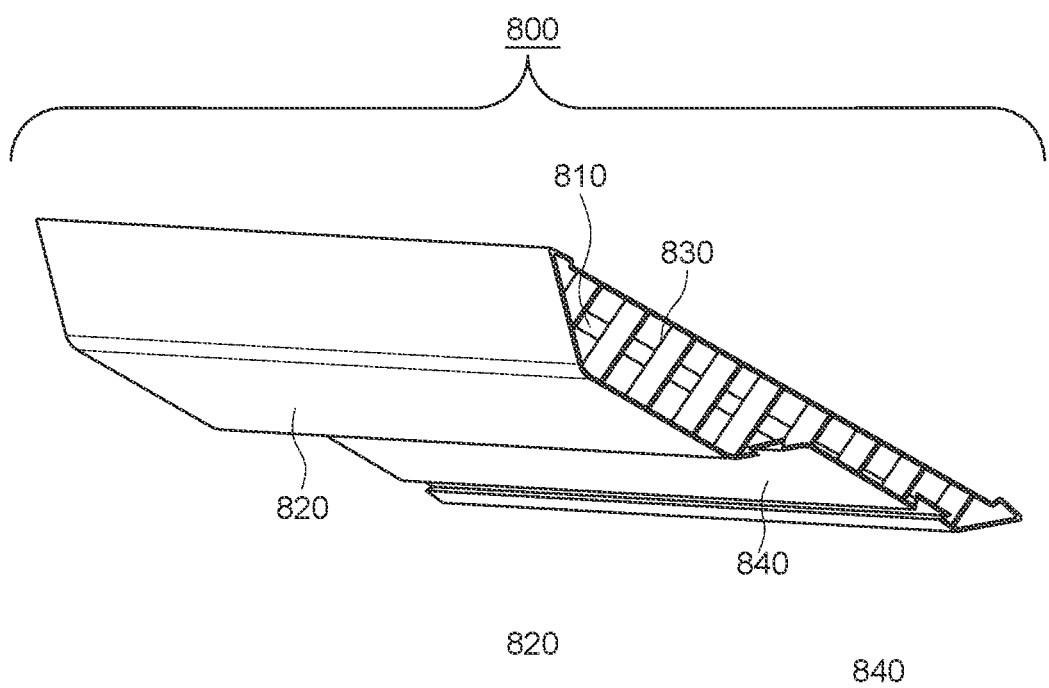
FIG. 7B shows a side cross-sectional view of the media-delivery device housing.
Figure 7C:
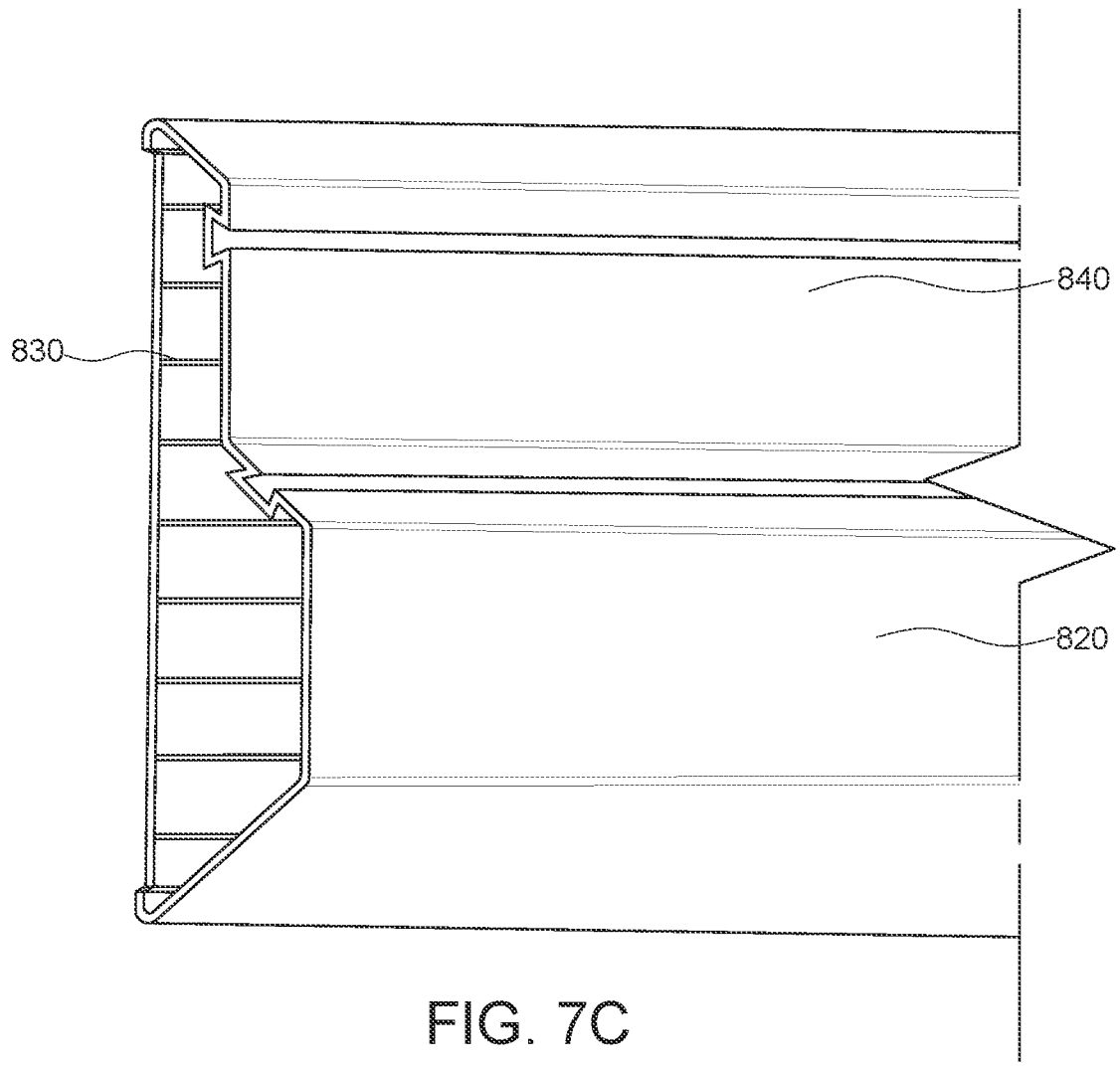
FIG. 7C shows a bottom view of the housing.
Figure 7D:
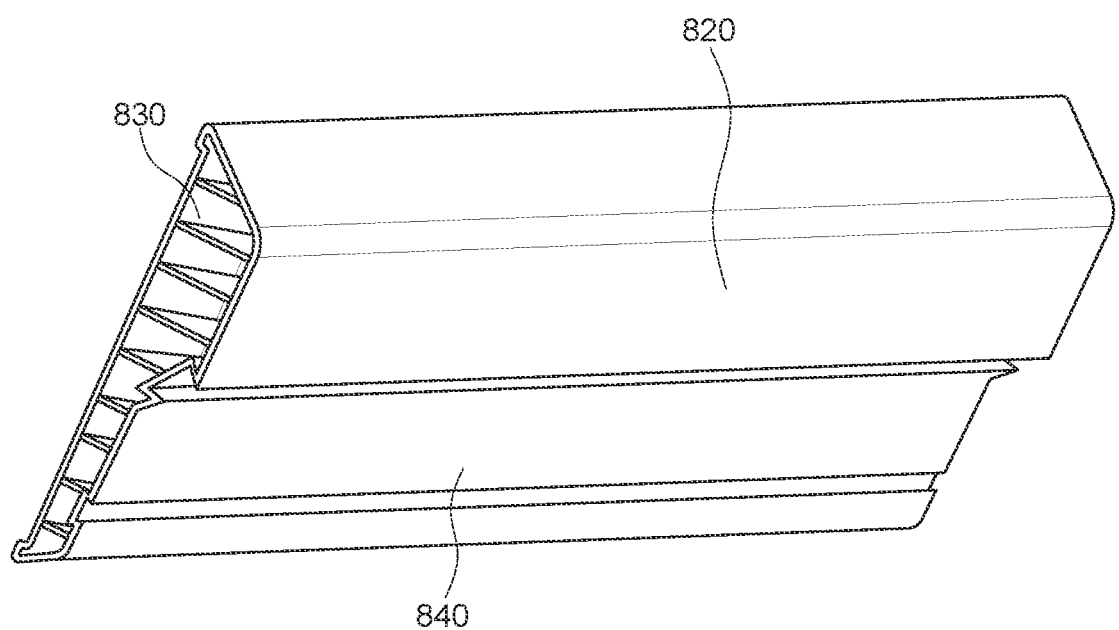
FIG. 7D shows a second bottom view of the housing that shows a length of the underside of the housing.

FIG. 7B shows a side cross-sectional view of the housing 800. The circuitry 810 is visible in the "b" or pregnant/bulbous portion 820 of the device. In addition, the vertical fins 830 within the design increase the strength of the housing 800 when facing extreme weather conditions or the strains of use. FIGS. 7C and 7D show the underside of the device. In each of FIGS. 7C and 7D, the housing comprises a bulbous portion 820 and a thin portion 840. The fins 830 within the design are also visible. The design allows for the bar to fit into the thin portion 840 of the device so as to reduce the elevation of the device away from the bar. In addition, the underside of the device can have two dovetails that run the complete length of the device to accommodate a range of clamps or other securing devices.

Figure 7E:
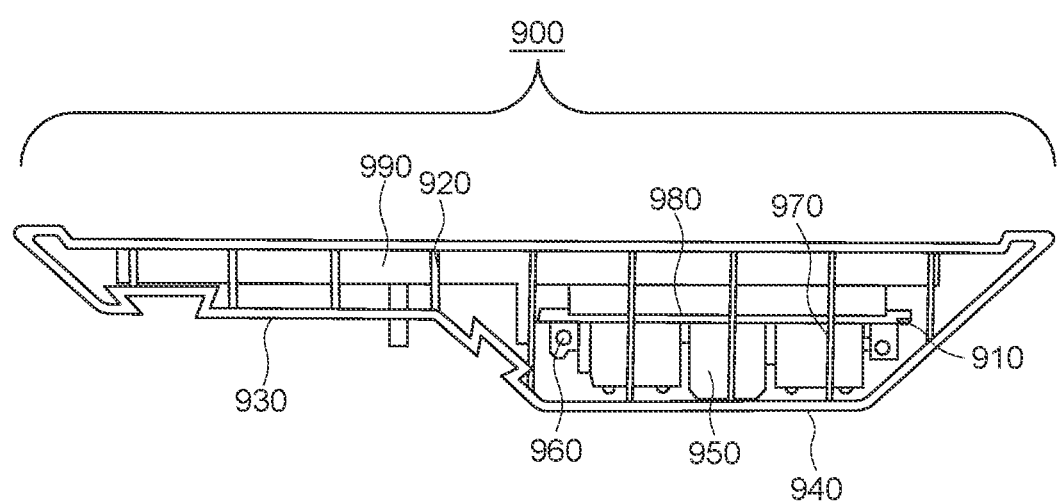
FIG. 7E is a cross-sectional view of the media-delivery device showing internal circuitry.

FIG. 7E shows the internal design and arrangement of the circuitry 910 of the media-delivery device within the housing 900. The housing 900 comprises fins 920 that provide additional support to the housing 900. The housing comprises a thin portion 930 where clamps (not shown) can be arranged to attach the housing 900 to a safety/comfort bar. The housing also includes a bulbous portion 940 in which a processor 950, WiFi connectivity 960, IIU 970, computer-readable media 980, and other circuitry are arranged. In addition, the bulbous portion 940 comprises operable connections to one or more displays 990.

The media-delivery device housing can be made of materials such as metals such as aluminum, aluminum alloys, and plastics such as polyethylene, polypropylene, and polyamides, semi-flexible material such as high density polyethylene (HDPE), and relatively inflexible material such as polystyrene and polyvinyl chloride. In some embodiments, the housing comprises fiberglass. In particular embodiments, the housing is made using techniques such as 3d printing, extrusion, or pultrusion.

Aspects of the present media-delivery devices include instructions in the computer-readable media relating to accessing information stored in one or more remote servers. The method of accomplishing this task includes: the processor accessing instructions upon receipt of information from the IIU. Information can be pertinent information relating to an individual positioned on a mobile device. For instance, the information can relate to the individual's room number at a hotel, the purchases of the individual, the individual's movie or television preferences, the individual's search history on the internet, the individual's preferences on surveys, or other information provided for the individual whose tag is identified by the IIU.

It should be noted that the media-content delivery systems can further comprise software to receive content from one or more servers. The servers can be a computer or multiple computers. Furthermore, the systems can comprise instructions for operating the display and the other features of the media-content delivery device. The instructions can be executable code or modules of executable code. For instance, the processor of the system can execute instruction code stored in the computer-readable memory. The computer-readable memory can be embodied as one or more computer-readable media, including Read-Only-Memory (ROM) and/or Random-Access-Memory (RAM). As such, the computer-readable memory can comprise one or more memory chips, optical memory devices (e.g., CD-ROM), magnetic memory devices (e.g., disk drives) or other types of memory. The computer-readable memory can store a number of software modules and other information particularly relevant to the media-content delivery device, such as software necessary to operate the display, respond to inputs from users, deliver content to the display, and play content on the display. Examples of content that can be played on the display includes, mpeg, jpeg, png, streaming technology, mp3, and other content formats.

3. Powering devices for delivering energy to one or more systems

The disclosed powering devices deliver energy to the media-delivery devices located on mobile units. As used herein, the term "mobile unit" refers to a means used to transport people or materials in an open or closed compartment. Non-limiting examples of mobile units are gondolas, trams, monorail cars, cars used in amusement park rides, chairlifts, chairs, or any other means used to move people from one location to another location at any given time.

Figure 2:
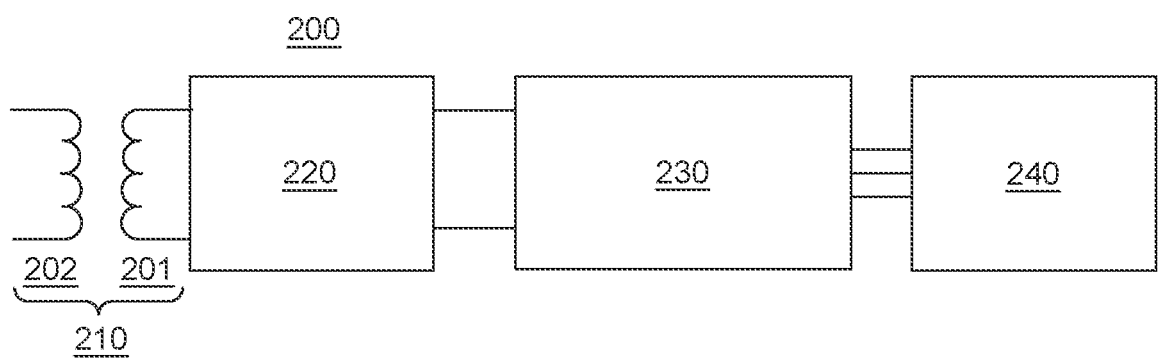
FIG. 2 is a generic flow chart representation of a device connected to an electronic device that is connected to a display.

FIG. 2 shows a generic representation of some embodiments of the disclosed powering devices. In FIG. 2, the device 200 comprises a charging couple 210—also known as an inductive couple. In some embodiments, the couple 210 is contactless. An advantage of contactless charging is that it allows for a high number of cycles without degradation in performance. In other embodiments, the device 200 comprises a wiper that makes contact. In certain embodiments, each member of the couple is a coil 201 and 202 that is herein described as a "charging coil." The first charging coil (e.g., charging coil) 201 is connected to an energy storage source 220. In certain embodiments, the energy storage 220 is one or more capacitors. In other embodiments, the energy storage 220 is one or more capacitors further connected to one or more batteries (e.g., lithium batteries). For instance, super capacitors can be used. Super capacitors allow for rapid charge during short duration when transmitter and receiver are within range. In other embodiments, batteries can be used. As used herein, the terms "a" or "an" means one or more and includes a plurality of the noun that is being modified unless indicated otherwise.

Regarding contact-based electricity transfer, the device 200 comprises first and second elements. The first element 201 can be a wiper or brush. As provided herein, a wiper can be any design that allows for the first element to make contact sufficient to transfer electricity from the second element 202 to the first element 201. For instance, the first element 201 can be designed to make contact with a rail (i.e., the second element 202) on which the mobile unit moves. Alternatively, the first element 201 can be designed to fit onto a structure in the base station specifically molded to contact the first element. The structure of the first element 201 can be a bar, roller, flat surface (e.g., plate), block, or any structure.

In additional contact-based embodiments, the first and second elements 201 and 202 can be any conductive material that allows for transfer of electricity from the second element to the first element. Furthermore, the first 201 and second 202 elements can make contact over any particular distance to allow for the transfer of electricity to the first element.

The energy storage unit 220 of the powering device is connected to one or more electronic components located in the media-delivery device 230. In particular embodiments, the one or more electronic components 230 are further connected to a display 240. The electronic components 230 can comprise processors and memory. In particular embodiments, the electronic component 230 is a voltage regulator. In more particular embodiments, the one or more electronic components 230 comprise one or more additional displays and other electronics, which is described more fully below. The display 240 can be a LED, LCD, or other electronic display device. Furthermore, the display 240 is capable of receiving and displaying video content, such as streamed media, mpg files, Adobe® Flash Player files, and any known video technology files.

FIG. 2 further shows a second charging coil 202 unconnected to the energy storage 220. The second charging coil 202 can provide energy to the first charging coil 201 when brought into a proximity of the first charging coil 201. As used herein, the term "a proximity" or "the proximity" refers to the distance between charging coils that allows for an inductive coupling between the charging coils.

Aspects disclosed herein provide for rapid-charging powering devices. In certain embodiments, the disclosed powering devices comprise one or more capacitors that can store a large amount of energy in a relatively short period of time as compared to standard lithium batteries. Examples of capacitors that can store a large amount of energy are super capacitors. Capacitors can be charged at much faster rates than batteries and for 500,000 to 1,000,000 cycles. Although capacitors have energy densities lower than conventional batteries, the amount of capacitance can be selected to meet the requirements of the discharge rate for a given application. Furthermore, capacitors have distinct advantages over batteries that allow for much faster charging in environments where there may not be enough time to charge conventional batteries.

The powering devices disclosed herein further comprise a first element (e.g., a wiper or charging coil) that is connected to the one or more capacitors. In particular embodiments, the first charging coil is designed to convert an electromagnetic field from a second charging coil into an electrical current. As the first charging coil comes into a proximity to a second charging coil, the first charging coil enters into the electromagnetic field of the second charging coil. The first charging coil converts the electromagnetic field into an electric current that is provided to the capacitors for storage.

In certain embodiments, the second element is located at a base station. As used herein, the term "base station" refers to a location in which one or more second charging coils are located. Base stations can be located at any position where a mobile unit will move a first element into a close proximity to the one or more second elements to allow for the charging of the capacitors. In certain embodiments, base stations are at fixed positions such as in at the ends of ski lifts. Base stations can also be located on poles, towers, rails, or any position that allows the second charging coil to come into a proximity of the first charging coil of the disclosed devices.

Additionally, base stations can be located at multiple positions for access to a mobile unit. For example, there can be a base station located at the bottom of a ski lift such that each chairlift (i.e., mobile unit) comes into close proximity to one or more second elements. There can also be multiple additional base stations located along the ski lift route up the mountain and at the top of the mountain. Thus, there can be a nearly innumerable number of base stations along the route that the chairlifts take.

It should be noted that each base station thus defines a "charging zone." The charging zone is the region in which the first and second elements are in proximity such that the capacitors receive an electric current. Thus, the "charging zone" can be defined by distance or the time spent by a mobile unit in the charging zone. When the mobile unit leaves the close proximity of the second element in the base station, the mobile unit enters the "discharging zone." The discharging zone is the region where the one or more capacitors discharge their stored energy to one or more electronic components located on the mobile unit. As with the charging zone, the "discharging zone" can be defined by distance or the time spent by a mobile unit in the discharging zone.

In some embodiments, the systems disclosed herein comprise a "standby zone." The "standby zone" is a feature in which the mobile unit is in a power down mode to conserve energy. In some embodiments, the standby mode occurs when the mobile unit is empty and the one or more electronic components are in off or power save mode. In other embodiments, the "standby zone" overlaps with the "charging zone" and the capacitors of the device are charged.

In certain contactless embodiments, the first and second charging coils are tuned to resonate at the same frequency. In some embodiments, the device further comprises a resonance transformer. In other embodiments, the second charging coil is configured to generate an oscillating current. In further embodiments, the first and second charging coils resonate to extend the charging zone range.

As would be clear to one of ordinary skill in the art from this disclosure, the time spent in the charging zone can be tailored to the particular requirements of the particular ride. For example, the charging zone can be made large enough such that it is approximately 20 times smaller than discharging zone—establishing a ratio of discharging zone time to charging zone time of 20 to 1. This can be accomplished by placing a certain number of second charging coils in the base station to tailor the range of the charging zone. The ratio can be as low as 1 to 1, 5 to 1, 10 to 1, 20 to 1, 30 to 1, 40 to 1, 50 to 1, 60 to 1, 70 to 1, 80 to 1, 90 to 1, or as high as 100 to 1, 150 to 1, 200 to 1, 250 to 1, 300 to 1, 350 to 1, 400 to 1, 450 to 1, 500 to 1, or even greater. The charging and discharging zone ratios can be defined by the time that a mobile unit spends in each zone and is defined by the speed of the mobile unit set by the operator of the units. For example, a mobile unit can spend 30 seconds in a charging zone and have sufficient power stored in the presently disclosed device to be in the discharging zone for extended periods of time (such as 15 minutes or longer). Another example would be a mobile unit entering a base station and traveling for one minute in the base station charging zone and remaining in the discharging zone for 30 minutes. The only limitation is the number of electronic components on the mobile unit as compared to the number of capacitors provided in a device, as well as the available charging current and the time in the charging zone.

Furthermore, the ratio of time in the charging zone to discharging zone depends on the individual application. One of ordinary skill in the art will recognize that a higher power draw in the discharge zone requires more charging time and/or higher charge currents. The current draw of a capacitor is a function of the total capacitance and the rate of change of the capacitor voltage with respect to time. Thus, a higher rate of change of voltage in the capacitor during charging equates to a higher current requirement The charging zone to discharging zone ratios depend on the ability of the one or more capacitors to absorb a high current in a short period of time, while discharging the stored energy over a longer period of time. By way of example only, the second charging coil can be connected to a power source that allows the second and first charging coils—when coupled—to transmit about 50 amps, about 100 amps, about 200 amps, or more to a capacitor. This can be accomplished at low voltages of about 5 volts or much higher voltages. In some embodiments, the device comprises one or more capacitors having a maximum voltage for each capacitor is 2.85 volts. Other voltages are possible for each capacitor. For instance, super capacitor have a predetermined maximum voltage that it can tolerate.

For example, when 100 amps at 5 volts is provided to the capacitor, this equates to 500 watts of power stored in the capacitor in a short period of time. However, one of ordinary skill in the art would recognize that the amount of power stored by the capacitors can be any amount that is necessary to provide power to the one or more electronic components during the entirety of the discharging zone. For instance, the device can store from about 10 watts of power to about 1000 watts or more. The amount of energy stored in the device is governed by the number of capacitors and the power source connected to the second charging coil. As used herein, the term "about" means +/−15% from the absolute number. For example, "about 20" would include from 17 to 23.

It should be noted that capacitors can draw large currents. An empty capacitor looks like a short circuit and will draw very large currents. This current is limited by an inline resistor or a current limited power supply. Once the capacitor begins to charge, the current tapers off until the capacitor reaches the charging voltage. The devices disclosed herein are only limited by the voltage rating of the capacitors (additive in series) and the current capacitor of the charging coils. The current limitation can be with the inductive interface.

Additionally, the period of time required to store the power can be less than about 30 seconds, about 30 seconds, less than about 1 minute, less than about 2 minutes, or a period of time that is allowed by the speed of the mobile unit. The amount of time needed to store the required power is governed by the power requirement of the electronic components on the mobile unit and the length of time that the mobile unit will be in the discharging zone, as well as the current limit of the inductive charging apparatus. As such, the disclosed devices can have a variable number of capacitors to store the required energy and the second charging coil can be connected to a sufficient power source to allow for enough electricity to be provided to the capacitors in the device.

When the device enters the discharging zone, the capacitors of the disclosed powering devices release the energy at lower currents. For example, a capacitor in the disclosed powering devices that received about 500 watts can discharge this energy to the one or more electronic components at currents of less than about 10 amps, less than about 5 amps, or about 1 amp at a voltage of about 5 volts. This equates to a power of about 5 watts released to the electronic components on the mobile unit. In such embodiments, the device stores a large amount of energy rapidly while releasing the energy more slowly. In certain embodiments, the devices comprise a voltage regulator to assist in maintaining a consistent voltage. In some embodiments, the one or more capacitors are connected to one or more batteries (e.g., lithium batteries).

Figure 3:
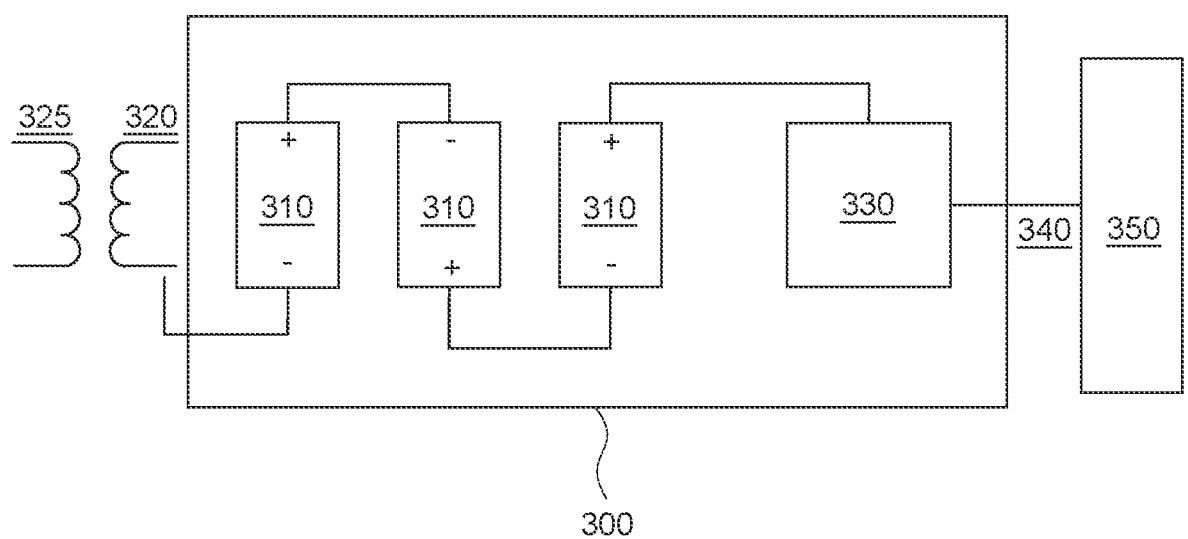
FIG. 3 is a flowchart showing the arrangement of capacitors in series.
Figure 5:
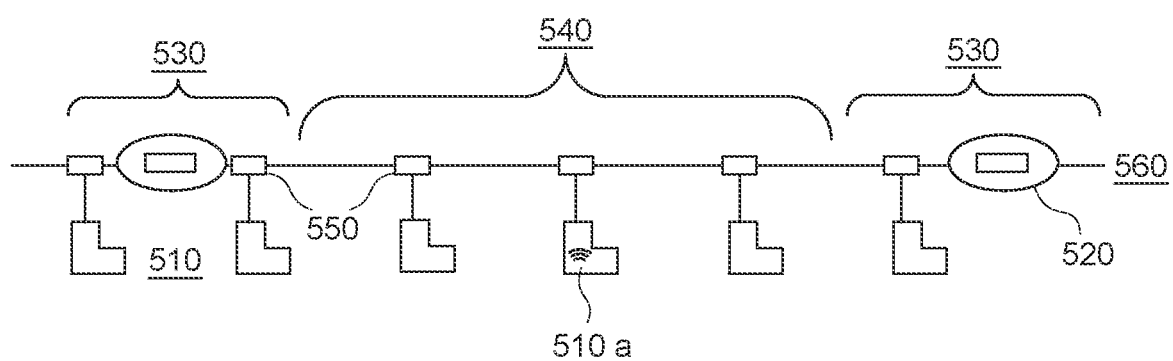
FIG. 5 shows a series of mobile units acting as a wireless network between base stations that act as charging zones.

FIG. 5 shows an arrangement in which each mobile unit 510 is traveling between base stations 520. Within the charging zones 530, the devices shown in FIGS. 1-3 are located on the mobile units 510, which are charged within the charging zones 530 by a charging couple as shown in FIG. 2, the second element 560 being located at each base station 520. The element 550 allows for charging with the second element 560 when within the charging zone 530. The mobile units 510 enter the discharging zones 540 between base stations. The mobile units 510 can act as mobile ad hoc networks in which the electronic components located on the mobile units 510 can access wireless networks to form ad hoc wireless networks. In some embodiments, the electronic components comprise a wireless access point on one or more mobile units 510a to allow each mobile unit 510 to access a wireless network.

Figure 4:
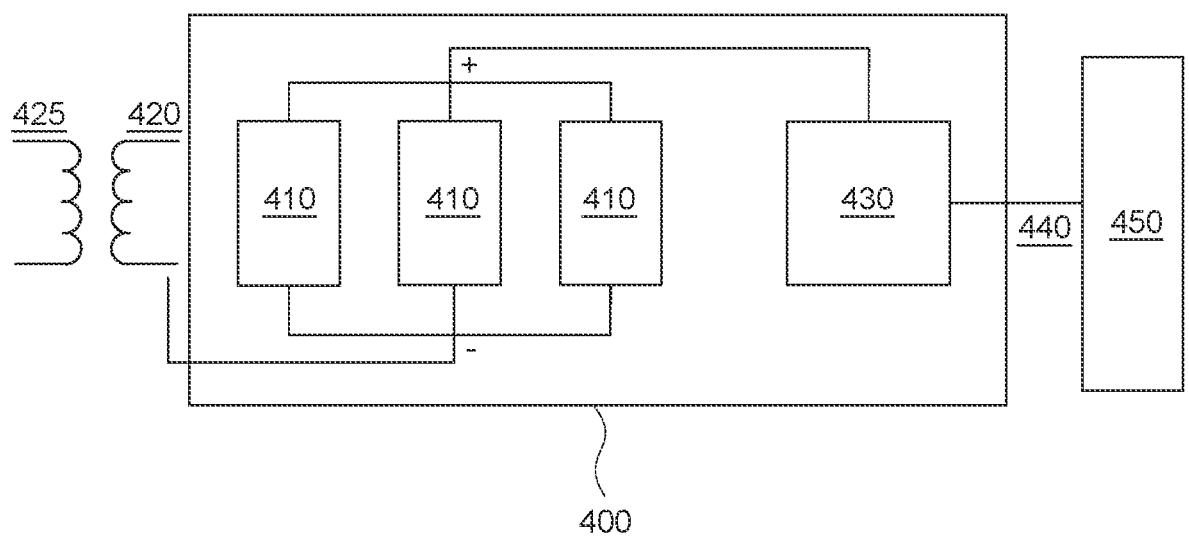
FIG. 4 is a flowchart showing the arrangement of capacitors in parallel.

In particular embodiments, the devices comprise a plurality of capacitors that are arranged in series when they are charged. As shown in FIG. 3, the capacitors 310 are located within a weather-proof container 300. The capacitors 310 are arranged in series and through connection 340 provide energy to multimedia component 350. The capacitors 310 obtain energy through connection to the charging component 320, which is energized by inductive coupling to charging component 325. In more particular embodiments, the plurality of capacitors 410 are arranged in parallel to the one or more electronic components 450 and voltage regulator 430 rather than in serial connection (FIG. 4). Components 440, 420, and 425 are the same as components 340, 320, and 325, respectively, in FIG. 3. Returning to FIG. 3, the capacitors 310 are connected to a voltage regulator 330 in series. The voltage regulator 330 provides consistent voltage to the multimedia component 350 during discharge of the capacitors 310.

Aspects of the powering devices disclosed herein comprise the first charging coil and second charging coil that each can comprise a material selected from the group consisting of 6H40, MnZn ferrite core materials, nickel, copper-ferrite core material, ETD-49 core (EPCOS AG), and materials listed in Table 1 below.

TABLE 1

Charging Coil Materials

| Potential Application | Alloys |
| --- | --- |
| Relays, solenoids | Electrical iron, Electrical iron-FM, silicon core iron "A," "A-FM," "B," "B-FM," "C" |

TABLE 1-continued

Charging Coil Materials

| Potential Application | Alloys |
| --- | --- |
| solenoids | Chrome Core: 8, 8-FM, 12, 12-FM, 13, 13-FM, 18-FM, 430-F solenoid quality, 430FR solenoid quality |
| Transformers, magnetic amplifiers, magnetic shielding, magnetic shielding - sheets, modem transformers, GFCI | Carpenter High Permeability "49" transformer or rotor grade, Hy-Ra "49," HyMu 77, HyMu 77 Plus, Carpenter HyMu "80," Hipernom, HyMu "80" Mark II, MyMu "800" and "800" A |
| Forged Eletromagnetic components, special transformers, aerospace generator | Hiperco 27, Hiperco 27 HS, Hiperco 59A, Hiperco 50, Hiperco 50HS |

In particular embodiments, the first 201 and second 202 charging coils both comprise the same materials. In other embodiments, the first charging coil 201 comprises a material that is different from the second charging coil 202. FIG. 1A also shows an illustrative embodiment of a device 100 attached to a chairlift 110. Each chairlift 110 moves into a base station 120. Each chairlift 110 comprises a device 100 comprising a first charging coil connected to an energy source (e.g., batteries, capacitors). In certain embodiments, the device 100 comprises a weatherproof container to protect the charging coil and capacitors. As shown in FIG. 1A, the device 100 is located on the arm 130 attaching the chairlift 110 to the ski lift line 140. As the chairlift 110 moves into a proximity of the second charging coil 150, the first charging coil converts the electromagnetic field of the second charging coil 150 into an electric current that is stored in the capacitors. In particular embodiments, the capacitors provide the stored energy to the electronic multimedia component 160 located on the safety bar 170 of the chairlift 110.

It should be noted that the powering device can be located at any position on the mobile unit so long as the position allows the first element to come into a close proximity of the second element to allow for transfer of electricity from the second element to the first element. In certain embodiments, this transfer is performed by contactless transfer such as inductive coupling. For example, the chairlifts 110 of FIG. 1 could have the device located on the safety bar such that when the bar is lifted to allow the users off the chair, the device comes into a proximity of the one or more second charging coils in the base station.

In particular embodiments, the mobile unit comprises a media-delivery device secured to the safety bar. The display(s) in the media-delivery device can be a high-definition screen such as an LCD, LED, LCD-LED. The display can show images or video, such as streamed video. In other embodiments, the electronic multimedia component comprises a USB port. In particular embodiments, the electronic multimedia component comprises computer-readable memory. Such memory allows for the storage of data such as streaming data, email data, text data, video data, or messaging. In other embodiments, the electronic multimedia component comprises streaming capabilities.

The electronic multimedia component can also comprise WiFi technology, one-way radio, two-way radio, and routers. In certain embodiments, a mobile unit is a wireless access point. In particular embodiments, the mobile unit allows for public service announcements, instant messaging, and advertisements. The presently disclosed devices provide sufficient power to the mobile units to allow for other types of media such as movies, television shows, and other high power-demand content to be shown on a display located on the mobile unit.

In further embodiments, each mobile unit 110 of FIG. 1 becomes a WiFi "hot spot." The device 100 provides sufficient power to allow each chairlift 110 to allow users of the chair to access the internet and receive any type of media content. With each chairlift 110 acting as a hot spot, the entire ski lift becomes a WiFi interconnected network that allows users to remain connected to the internet and distribute information from one chair to another. Without the advantages conferred by the presently disclosed devices, the chairlifts 110 would have insufficient power reserves to power this range of devices.

Figure 1B:
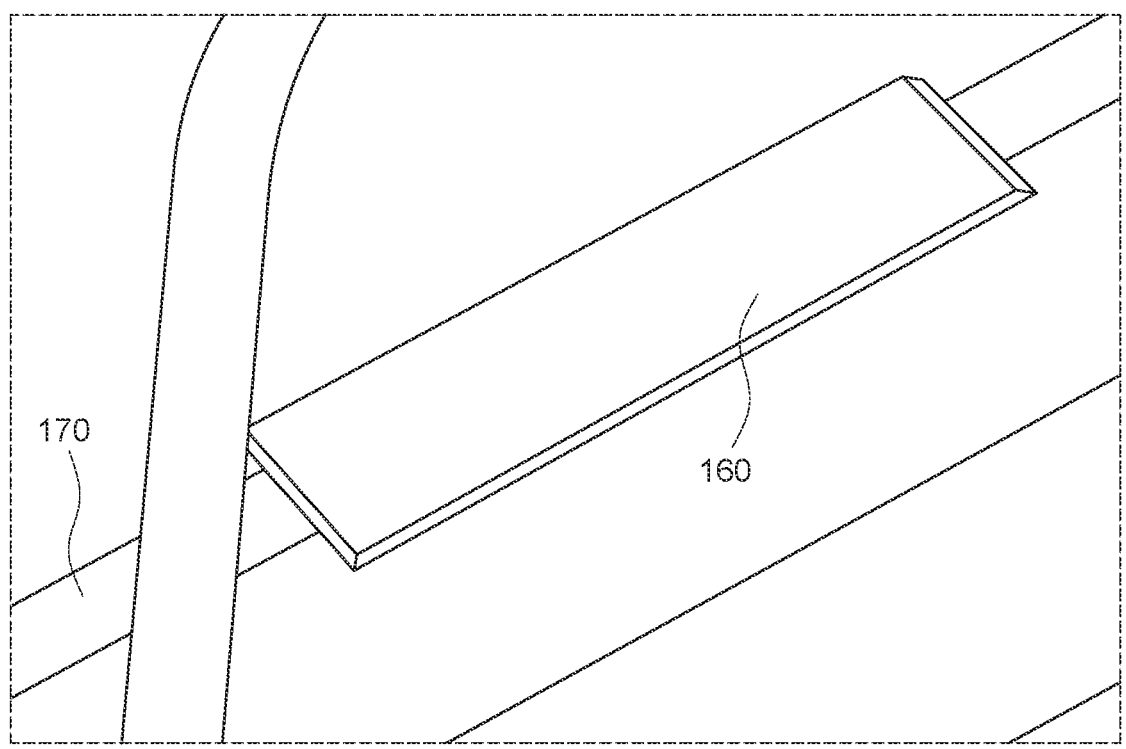
FIG. 1B is a close-up view of the safety bar of a mobile unit and the multimedia component attached to the safety bar.

FIG. 1B shows a close-up view of the media-delivery device 160 attached to the safety bar 170. The media-delivery device 160 in this embodiment is connected to the energy source through connections on the underside of the safety bar 170. Alternatively, the media-delivery device 160 can be connected to the energy source by connections running through the safety bar 170. There is not particular limitation on the transmission of energy from the energy source to the media-delivery device 160 so long as the media-delivery device 160 receives the energy in a safe and reliable way.

In certain embodiments, the media-delivery device 160 comprises a processor and memory. The memory stores instructions that are executable by the processor. In particular embodiments, the processor executes instructions to show a video or series of images. In other embodiments, the processor executes instructions so as to respond to a command from a user of the media-delivery device 160. For instance, the media-delivery device 160 can comprise a touchscreen responsive to a user's commands. In some embodiments, the media-delivery device 160 comprises executable instructions allowing users to play videogames, connect with the internet, select media from a library, or connect with devices such as Smartphones or wireless media devices.

Figure 1C:
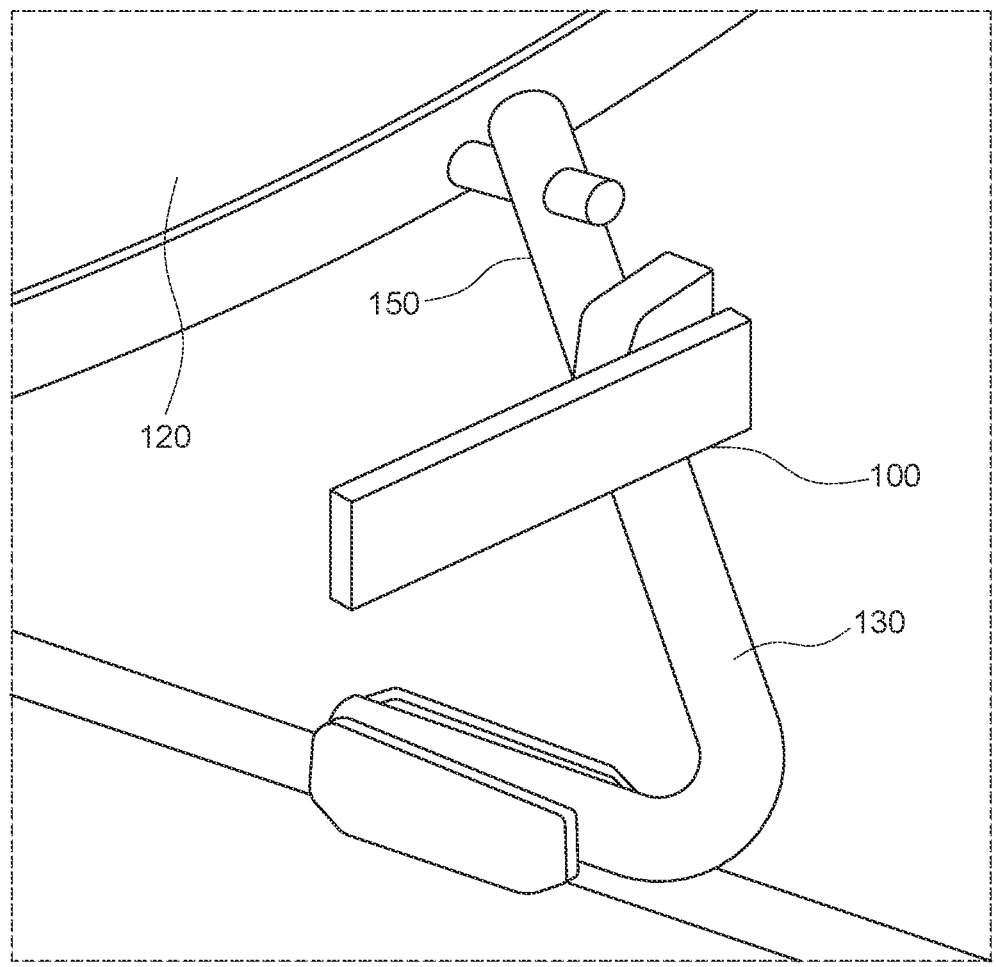
FIG. 1C is a close-up view of the device within a weather-proof container in close proximity to a charging component.

FIG. 1C shows a close-up view of the powering device 100 and second charging component 150. In this embodiment, the second charging component 150 is a charging coils that allows for inductive coupling to the charging coil of the powering device 100. The first and second charging components form an inductive couple that allows for the transfer of energy from the second component 150 to the energy source in the powering device 100. In other embodiments, a contact is made between the first and second charging components. The presently disclosed devices can also power other electronic components. Such components comprise seat warmers that remain warm during the entire time that a mobile unit is away from the charging region. Other electronic components include lights, amusement effects such as vibrating components in seats, loudspeakers, speakers, and any type of device that utilizes electricity.

Additionally, the disclosed devices can be used in almost any context in which a mobile unit does not have the capacity to power one or more electronic devices without resorting to onboard power storage. Examples of such applications include amusement park rides such as rollercoasters and other rides in which a mobile unit is moved from a first point to a second point. Other examples include trams, monorails, gondolas, or any vehicle, car, or other mobile unit moves from a first location to a second location and comprises electronic components that cannot be powered by the mobile unit.

4. Methods for Delivering Energy to One or More Systems

Disclosed herein are methods of powering one or more electronic components located on a mobile unit. The methods can comprise the attaching of a first element (e.g., first charging coil or wipers) to a mobile unit. The first element is then connected to an energy storage unit that is also attached to the mobile unit. The first element and the energy storage unit can be located in the same position on the mobile unit or can be attached to different locations on the mobile unit. Additionally, the first element and energy storage unit can be located in a container. In certain embodiments, the container is weatherproof.

Aspects of the methods include attaching a second element (e.g., second charging coil or electrical contact such as a rail) to a base station. The second element is positioned on the base station such that the first element comes into a close proximity of a second element attached to the base station. When the first element comes into close proximity of the second element, the energy storage unit is charged. In certain embodiments, the energy charging unit comprises one or more capacitors such super capacitors.

In particular embodiments, the method includes the discharging of one or more capacitors to power one or more electronic components as the mobile unit moves out of the base station and enters a discharging zone. The one or more capacitors power the one or more electronic components more the energy stored in the one or more capacitors until the mobile unit reaches another base station.

The methods further comprise attaching one or more second elements at each one of multiple positions to allow a mobile unit to come into a close proximity of second elements along the route that the mobile unit takes. In some embodiments, the mobile unit moves through multiple charging zones during as moves along a particular route. In particular embodiments, the mobile unit moves when outside of the base station to allow for providing of power to the one or more electronic components while minimizing the probability that the one or more capacitors will discharge completely prior to entering the base station In addition, the methods further can comprise connecting the one or more capacitors to one or more batteries (e.g., lithium batteries). The one or more capacitors can be connected serially to the first charging coil. In some embodiments, the one or more capacitors are connected in parallel to the one or more electronic components.

Aspects of the disclosed methods include providing power to one or more electronic components on a mobile unit in which the mobile unit is one of a plurality of mobile units forming a system. In certain embodiments, each mobile unit communicates with another mobile unit in the system. In other embodiments, each mobile unit allows users riding in the unit to communicate with other users riding in other mobile units in the system. In still other embodiments, each mobile unit comprises a router that allows for the mobile unit to become a WiFi hot spot. In particular embodiments, the mobile units create a WiFi network in the system. In still other embodiments, each mobile unit allows for the streaming of media content to the users riding in the unit and allows for content to be delivered from one mobile unit to another.

Aspects of the methods disclosed herein include mobile units comprising one or more media devices to create a multimedia experience in the system. For instance, each mobile unit can share media content with other mobile units and can store content in computer-readable memory. Each mobile unit in the system can also create an entertainment experience by syncing lights and audio between the mobile units within the system.

As noted herein, the disclosed devices and methods allow for all of these possibilities due to the increased power storage of the disclosed devices, as well as the increased rapidity by which energy can be stored in the device as compared to prior known storage devices. As such, the disclosed device and methods now allow for improved amusement rides, ski lifts, trams, monorails, gondolas, and other mobile units that heretofore were restricted due to the power consumption of modern devices. One of ordinary skill in the art will also recognize that the disclosed embodiments are illustrative and that equivalents of such embodiments also fall within the scope of this disclosure.

We claim:

1. A method of media-content delivery, the method comprising:
   a. providing a media-delivery identification system comprising a media-delivery device having a display, a processor, and a computer-readable memory, the processor being connected to the computer-readable memory, the media-delivery device being operably linked to one or more power units comprising a charging couple and at least one energy storage unit, the media-delivery device further comprising an individual identification unit, the individual identification unit being configured to obtain information from a tag having information relating to a user of the media-delivery device
   b. the media-content delivery device being operably linked to an energy storage unit comprising one or more capacitors, the energy storage unit further comprising a charging couple;
   c. the processor executing instructions in response to an input by the user to obtain information from one or more servers operably linked to the media-content delivery system over a wireless connection;
   d. the processor executing instructions to receive media content from the one or more servers over the wireless connection;
   e. the processor executing instructions to provide the media content to a display, wherein the media content is displayed in a pre-determined format relating to the type of media content responsive to the input by the user;
   wherein the media-content delivery device comprises a housing having a bulbous portion and a thin portion and wherein the media-delivery system comprises fins within the bulbous and thin portions such that the fins are configured to reinforce the housing integrity.

2. The method of claim 1, wherein the one or more servers are business-specific content servers located at the site of the business.

3. The method of claim 1, wherein the housing holds the processor, a computer-readable memory and the display.

4. The method of claim 3, wherein the flat portion is connected to a bulbous portion.

5. The method of claim 3, wherein the bulbous portion contains the processor, the computer-readable memory, and a circuitry.

6. The method of claim 4, wherein the flat portion comprises the display.

7. The method of claim 1, wherein the housing comprises two pieces of molded material.

8. The method of claim 1, wherein the housing comprises clamps to be attached to a safety bar of a mobile unit.

9. The method of claim 1, wherein the media-delivery system device comprises an electronic multimedia component.

10. The method of claim 9, wherein the electronic multimedia component comprises one or more ports.

11. The method of claim 1, wherein the media-delivery identification system is located on a chairlift.

12. The method of claim 3, wherein the computer-readable memory is configured to store information selected from the group consisting of streaming data, email data, text data, video data, messaging data, and audio data.

13. The method of claim 1, wherein the processor accesses instructions stored in the computer-readable memory to: i) stream video data to the display.

14. The method of claim 1, wherein the housing further comprises a surface configured to allow attachment of a printed media.

15. The method of claim 1, wherein the charging couple comprises a first charging coil.

16. The method of claim 2, wherein the charging couple comprises a second charging coil.

17. The method of claim 16, wherein the first charging coil is operably linked to the energy storage unit.

* * * * *